(12) United States Patent
Pliskin et al.

(10) Patent No.: US 11,159,567 B2
(45) Date of Patent: Oct. 26, 2021

(54) MALICIOUS CLOUD-BASED RESOURCE ALLOCATION DETECTION

(71) Applicant: Microsoft Technology Licensing, LLC, Redmond, WA (US)

(72) Inventors: Ram Haim Pliskin, Rishon Lezion (IL); Roy Levin, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 461 days.

(21) Appl. No.: 16/101,398

(22) Filed: Aug. 11, 2018

(65) Prior Publication Data
US 2020/0053123 A1 Feb. 13, 2020

(51) Int. Cl.
*H04L 29/06* (2006.01)
*G06F 9/455* (2018.01)
(Continued)

(52) U.S. Cl.
CPC ...... *H04L 63/1491* (2013.01); *G06F 9/45558* (2013.01); *G06F 9/5027* (2013.01);
(Continued)

(58) Field of Classification Search
CPC . H04L 63/1491; G06N 20/00; G06F 9/45558; G06F 9/5027; G06K 9/6267
(Continued)

(56) References Cited

U.S. PATENT DOCUMENTS

| 9,483,742 B1 * | 11/2016 | Ahmed ................ G06N 20/00 |
| 2016/0112397 A1 | 4/2016 | Mankovskii |

(Continued)

FOREIGN PATENT DOCUMENTS

| CN | 105187395 A | 12/2015 |
| WO | 2017013589 A1 | 1/2017 |

OTHER PUBLICATIONS

"International Search Report and Written Opinion Issued in PCT Application No. PCT/US2019/039664", dated Sep. 24, 2019, 11 Pages.

*Primary Examiner* — Noura Zoubair
*Assistant Examiner* — Phuc Pham
(74) *Attorney, Agent, or Firm* — Fiala & Weaver P.L.L.C.

(57) ABSTRACT

Methods, systems, and computer program products are described herein for detecting malicious cloud-based resource allocations. Such detection may be achieved using machine learning-based techniques that analyze sequences of cloud-based resource allocations to determine whether such sequences are performed with a malicious intent. For instance, a sequence classification model may be generated by training a machine learning-based algorithm on both resource allocation sequences that are known to be used for malicious purposes and resource allocation sequences that are known to be used for non-malicious or benign purposes. Using these sequences, the machine learning-based algorithm learns what constitutes a malicious resource allocation sequence and generates the sequence classification model. The sequence classification model is used to classify any sequence of resource allocation operations performed via a valid user's cloud services subscription provided thereto as being a malicious sequence or a non-malicious sequence.

20 Claims, 6 Drawing Sheets

(51) Int. Cl.
*G06F 9/50* (2006.01)
*G06K 9/62* (2006.01)
*G06N 20/00* (2019.01)

(52) U.S. Cl.
CPC ........... *G06K 9/6267* (2013.01); *G06N 20/00* (2019.01); *G06F 2009/45562* (2013.01); *G06F 2009/45587* (2013.01); *G06F 2009/45591* (2013.01)

(58) Field of Classification Search
USPC .......................................................... 726/23
See application file for complete search history.

(56) References Cited

U.S. PATENT DOCUMENTS

2017/0134423 A1\* 5/2017 Sysman ................. G06F 21/554
2017/0289191 A1\* 10/2017 Thioux ............... H04L 63/1441

\* cited by examiner

User Portal

SSD ∨ — 202  Disk Type

No. of Virtual Machines

[slider] — 204   | 1 | VM(s)

Amount of Storage

[slider] — 206   | 8 | Gb

No. of Storage Disks

[slider] — 208   | 32 | Disk(s)

Input/Output Operations per Second (IOPS)

[slider] — 210   | 6400 | IOPS

Submit — 212

MALICIOUS CLOUD-BASED RESOURCE ALLOCATION DETECTION

BACKGROUND

Cloud computing platforms offer higher efficiently, greater flexibility, lower costs, and better performance for applications and services relative to "on-premises" servers and storage. Accordingly, users are shifting away from locally maintaining applications, services, and data and migrating to cloud computing platforms. This migration has gained the interest of malicious entities, such as hackers. Hackers attempt to gain access to valid subscriptions to cloud computing platforms in an attempt to leverage the massive amount of computing resources for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for detecting malicious cloud-based resource allocation operations. Such detection may be achieved using machine learning-based techniques that analyze sequences of cloud-based resource allocations to determine whether such sequences are performed with a malicious intent. For instance, a sequence classification model may be generated by training a machine learning-based algorithm on both resource allocation sequences that are known to be used for malicious purposes and resource allocation sequences that are known to be used for non-malicious (benign) purposes. The known, malicious resource allocation sequences may be obtained by tracking resource allocation sequences performed via honeypot cloud resources subscription accounts, which are created with the sole purpose of luring a hacker to compromise and utilize such accounts for malicious purposes. The known, benign resource allocation sequences may be obtained by tracking resource allocation sequences performed by valid cloud resources subscriptions associated with other, valid users. Using these sequences, the machine learning-based algorithm learns what constitutes a malicious resource allocation sequence and generates the sequence classification model. The sequence classification model is used to classify any sequence of resource allocation operations performed via a valid user's cloud services subscription provided thereto as being a malicious sequence or a non-malicious sequence.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2A depicts an example portal having a graphical user interface screen that enables a user to allocate cloud-based resources in accordance with an embodiment.

Figure 1:
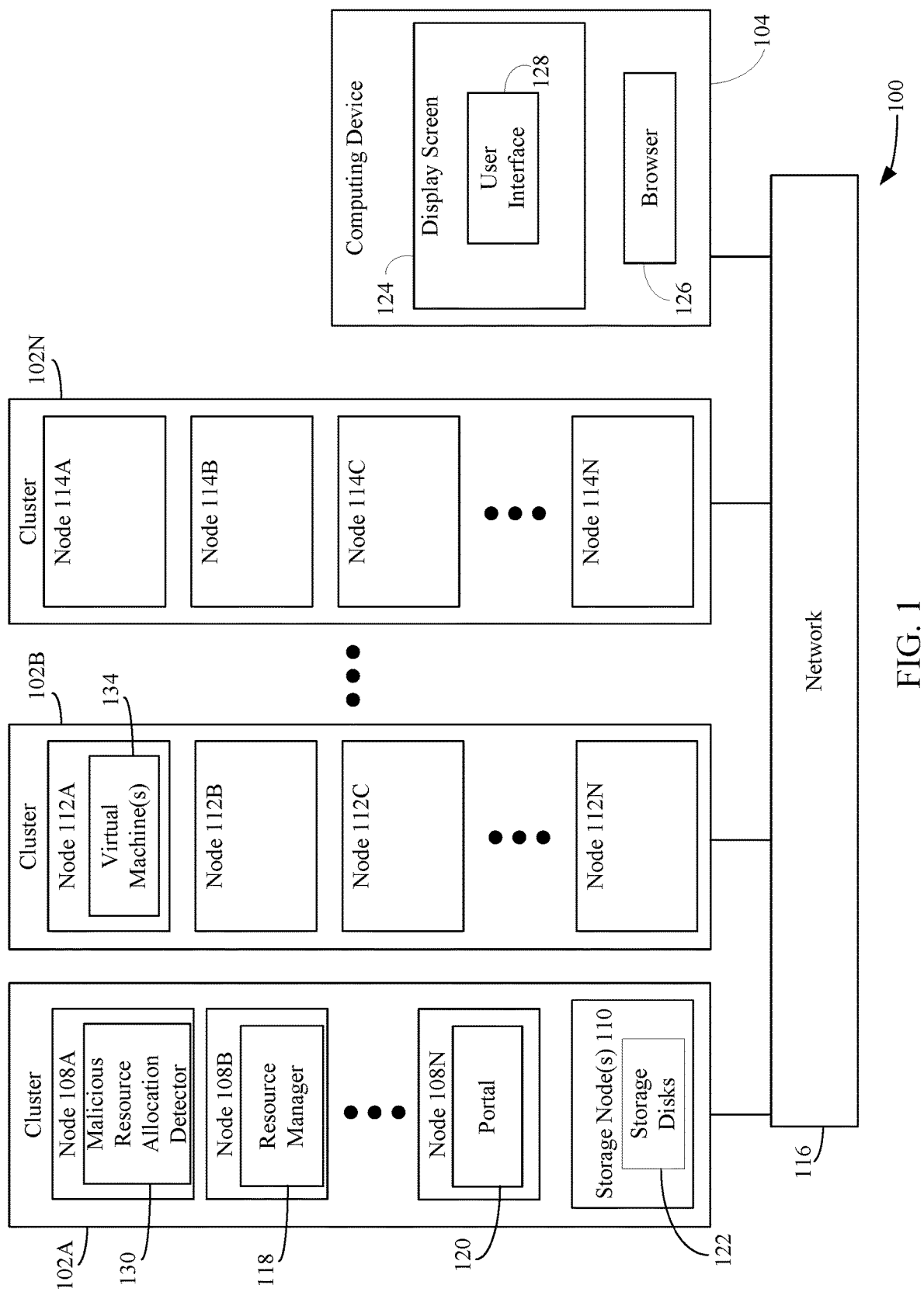
FIG. 1 is a block diagram of a network-based computing system configured for detecting malicious cloud-based resource allocation operations in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection.

Furthermore, embodiments disclosed in any section/subsection may be combined with any other embodiments described in the same section/subsection and/or a different section/subsection in any manner.

II. Example Embodiments for Malicious Cloud-Based Resource Allocation Detection

Example embodiments are described herein for detecting malicious cloud-based resource allocation operations. Such detection may be achieved using machine learning-based techniques that analyze sequences of cloud-based resource allocations to determine whether such sequences are performed with a malicious intent. For instance, a sequence classification model may be generated by training a machine learning-based algorithm on both resource allocation sequences that are known to be used for malicious purposes and resource allocation sequences that are known to be used for non-malicious or benign purposes. The known, malicious resource allocation sequences may be obtained by tracking resource allocation sequences performed via honeypot cloud resources subscriptions, which are created with the sole purpose of luring a hacker to compromise and utilize such accounts for malicious purposes. The known, benign resource allocation sequences may be obtained by tracking resource allocation sequences performed by valid cloud resources subscriptions associated with other, valid users. Using these sequences, the machine learning-based algorithm learns what constitutes a malicious resource allocation sequence and generates the sequence classification model. The sequence classification model is used to classify any sequence of resource allocation operations performed via a valid user's cloud services subscription provided thereto as being a malicious sequence or a non-malicious sequence.

For example, FIG. 1 shows a block diagram of an example network-based computing system 100 configured for detecting malicious cloud-based resource allocation operations, according to an example embodiment. As shown in FIG. 1, system 100 includes a plurality of clusters 102A, 102B and 102N. A computing device 104 is communicatively coupled with system 110 via network 116. Furthermore, each of clusters 102A, 102B and 102N are communicatively coupled to each other via network 116, as well as being communicatively coupled with computing device 104 through network 116. Network 116 may comprise one or more networks such as local area networks (LANs), wide area networks (WANs), enterprise networks, the Internet, etc., and may include one or more of wired and/or wireless portions.

Clusters 102A, 102B and 102N may form a network-accessible server set. Each of clusters 102A, 102B and 102N may comprise a group of one or more nodes and/or a group of one or more storage nodes. For example, as shown in FIG. 1, cluster 102A includes nodes 108A-108N and one or more storage nodes 110, cluster 102B includes nodes 112A-112N, and cluster 102N includes nodes 114A-114N. Each of nodes 108A-108N, 112A-112N and/or 114A-114N are accessible via network 116 (e.g., in a "cloud-based" embodiment) to build, deploy, and manage applications and services. Each of storage node(s) 110 comprises a plurality of physical storage disks 122 that is accessible via network 116 and is configured to store data associated with the applications and services managed by nodes 108A-108N, 112A-112N, and/or 114A-114N.

In an embodiment, one or more of clusters 102A, 102B and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N may be a datacenter in a distributed collection of datacenters.

Each of node(s) 108A-108N, 112A-112N and 114A-114N may be configured to execute one or more software applications (or "applications") and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node 108B is configured to execute a resource manager 118, node 108A is configured to execute a malicious resource allocation detector 130, node 108N is configured to execute a portal 120, and node 112A is configured to execute one or more virtual machine(s) 134.

It is noted that each of resource manager 118, malicious resource allocation detector 130, portal 120, and virtual machine(s) 134 may be executing on the same node or same cluster or, alternatively, on a different node or different cluster. It is further noted that cluster 102B and/or cluster 102N may also include storage node(s) 110.

A user may be enabled to utilize the services offered by the network-accessible server set via portal 120. For example, a user may be enabled to utilize the services offered by the network-accessible server set by signing-up with a cloud services subscription with a service provider of the network-accessible server set (e.g., a cloud service provider). Upon signing up, the user may be given access to portal 120. A user may access portal 120 via computing device 104. As shown in FIG. 1, computing device 104 includes a display screen 124 and a browser 126. A user may access portal 120 by interacting with an application executing on computing device 104 capable of accessing portal 120. For example, the user may use browser 126 to traverse a network address (e.g., a uniform resource locator) to portal 120, which invokes a user interface 128 (e.g., a web page) in a browser window rendered on computing device 104. The user may be authenticated (e.g., by requiring the user to enter user credentials (e.g., a user name, password, PIN, etc.)) before being given access to portal 120. Computing device 104 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Upon being authenticated, the user may utilize portal 120 to allocate, modify, and/or deallocate cloud-based resources, build, manage, monitor, and/or launch applications (e.g., ranging from simple web applications to complex cloud-based applications), enable a user to configure one or more of node(s) 108A-108N, 112A-112N, and 114A-114N to operate as a particular server (e.g., a database server, OLAP server, etc.), etc. Examples of cloud-based resources include, but are not limited to virtual machine(s) 134, storage disks 122, web applications, database servers, etc.

Portal 120 may be configured in any manner, including being configured with any combination of text entry, one or more graphical user interface (GUI) controls, etc., to enable user interaction. For instance, FIG. 2A depicts an example portal GUI screen 200A that enables a user to allocate cloud-based resources in accordance with an embodiment. As shown in FIG. 2A, main portal GUI screen 200A includes an interface element 202, an interface element 204, an interface element 206, an interface element 208, an interface element 210, and an interface element 212. Interface element 202 enables a user to select the types of storage disks 122 to be allocated (e.g., solid state drive(s) (SSD(s)), hard disk drive(s) (HDD(s)), etc.). Interface element 204 enables the user to select the number of virtual machine(s) (e.g., 1 virtual machine (VM), 100 VMs, 1000 VMs, etc.) to be allocated. Interface element 206 enables the user to select the total amount of storage to be allocated (e.g., 8 Gigabytes (GB), 16 GB, 32 GB, etc.). Interface element 208 enables the user to select the total number of storage disks 122 to be allocated (e.g., 4 disks, 8 disks, 32 disks, etc.). Interface element 210 enables the user to specify certain performance metrics associated with storage disks 122 to be allocated (e.g., a maximum number of input/output operations per second (IOPS) (e.g., 25600 IOPS, 50000 IOPS, etc.) that the total number of storage disks 122 can sustain. After a user has specified the number, type, performance metrics, etc. of the cloud-based resources to be allocated, the user may initiate allocation of the cloud-based resources by interacting with interface element 212, which may or may not require payment submission.

As shown in FIG. 2A, interface element 202 is shown as a pull-down menu, interface elements 204, 206, 208, and 210 are shown as sliders, and interface element 212 is shown as a button. However, the embodiments described herein are not so limited. For example, each of interface elements 202, 204, 206, 208, 210, and 212 may be any type of interface elements (e.g., buttons, sliders, pull-down menus, text boxes, etc.). Furthermore, fewer, greater, and/or alternative numbers and types of interface elements corresponding to cloud-based resource allocation may be present in embodiments.

Referring again to FIG. 1, resource manager 118 is configured to generate an activity log each time a user logs into his or her cloud services subscription via portal 120. The period in which a user has logged into and logged off from portal 120 may be referred to as a portal session. Each activity log may identify resource allocation operations that have occurred during a given portal session. Each activity log may further identify the user that is logged into a portal session, and/or a time at which each resource allocation operation occurred. Examples of resource allocation operations include, but are not limited to, an allocation of a virtual machine, an allocation of a storage disk, a deallocation of a virtual machine, a deallocation of a storage disk, etc.

Malicious resource allocation detector 130 may be configured to detect if a sequence of resource allocation operations performed with respect to a user's cloud services subscription is a malicious resource allocation sequence. For example, a malicious entity (e.g., a hacker) may obtain access to a user's cloud services subscription account and use the subscription to allocate cloud-based resources to perform certain malicious activities. For instance, the malicious entity may provision thousands of virtual machines in order to initiate a brute force attack, in which the virtual machines are utilized to determine user credentials of a particular account (e.g., bank account, credit card account, etc.) associated with a third party. In particular, the virtual machines may be configured to systematically try all possible passwords, passphrases, PINs for a particular account until the correct one is found. In another example, a malicious entity may provision thousands of virtual machines in order to perform a denial of service attack, where the virtual machines are used to overload a third party's particular server with more network requests than the server can process. In yet another embodiment, a malicious entity may provision thousands of virtual machine in order to perform certain processor-intensive tasks, including, but not limited to, bit mining, social network-based persuasion campaigns, etc.

Malicious resource allocation detector 130 may utilize machine learning-based techniques to determine whether a user's account has been compromised by a malicious entity to perform malicious resource allocations. For example, malicious resource allocation detector 130 may train a machine learning algorithm to generate a sequence classification model. The machine learning algorithm may be trained using one or more sequences of resource allocation operations that are known to be malicious and/or one or more sequences of resource allocation operations that are known to be non-malicious (benign).

The malicious sequence(s) of resource allocation operations may be obtained by creating one or more decoy (or "honeypot") cloud services subscriptions. The credentials to such subscription(s) may be leaked to a targeted audience (e.g., a known hacker chat room), the general public, and/or other audience with the intent that malicious entit(ies) utilize such credentials to access the decoy cloud service subscription(s) to allocate and/or deallocate cloud-based resources for malicious purposes. Because only malicious entities would utilize such decoy cloud services subscription credentials, it is inferred that any sequence of resource allocation operations performed during any given session of such a decoy cloud services subscription are for malicious purposes. The malicious sequence(s) may be identified and/or tracked via the activity logs that are generated by resource manager 118 for each session in which the malicious entity logs into a particular decoy cloud services subscription.

The non-malicious sequence(s) of resource allocation operations may be obtained by tracking the activity logs that are generated by resource manager 118 for other user(s) having a valid cloud services subscription. Because only valid (i.e., non-malicious users) typically utilize valid cloud services subscriptions, and do so for a benign purpose, it is inferred that any sequence of resource allocation operations performed during any given session in which a valid user logs into his or her cloud services subscriptions is for non-malicious purposes.

Figure 2B:
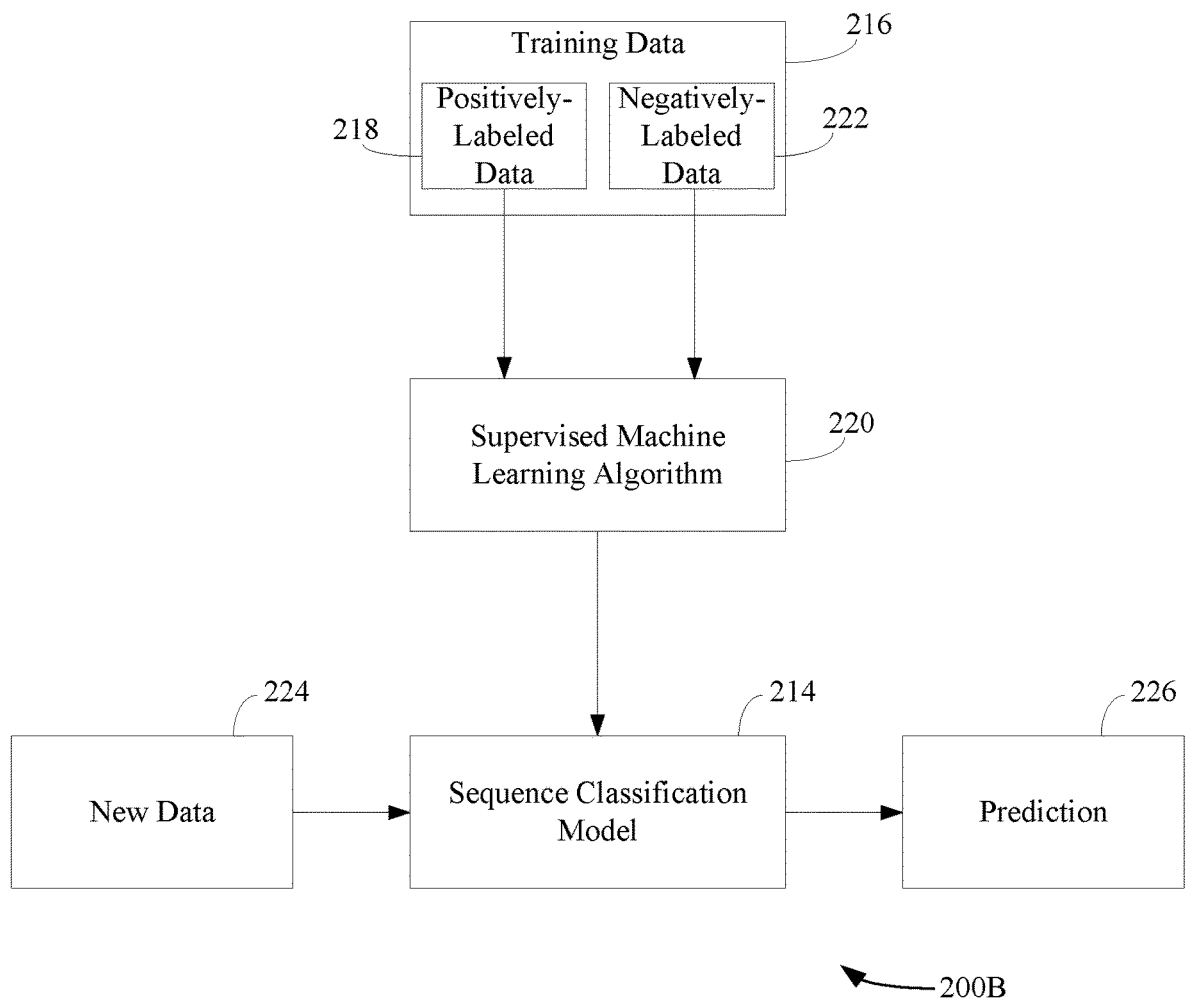
FIG. 2B is a block diagram illustrating a supervised machine learning algorithm in accordance with an embodiment.

In accordance with an embodiment, the machine learning algorithm may be a supervised machine learning algorithm. In accordance with such an embodiment, the machine learning algorithm learns what constitutes a malicious sequence of resource allocation operations using the sequences of resource allocation operations that are known to be malicious and the sequences of resource allocation operations that are known to be non-malicious. For instance, FIG. 2B is a block diagram illustrating a supervised machine learning algorithm 222 in accordance with an embodiment. Malicious resource allocation detector 130 may comprise supervised machine learning algorithm 222. Malicious resource allocation detector 130 may provide supervised machine learning algorithm 222 training data 216. Training data 216 may comprise positively-labeled sequences of resource allocation operations included in the activity logs associated with the decoy cloud services subscriptions as being "malicious" (shown as positively-labeled data 218) and negatively-labeled sequences of resource allocation operations included in the activity logs associated with the valid cloud services subscriptions as being "non-malicious" (shown as negatively-labeled data 222). Positively-labeled data 218 is provided as a first input to supervised machine learning algorithm 220, and negatively-labeled data 222 is provided as a second input to supervised machine learning algorithm 220. Using these inputs, supervised machine learning algorithm 220 learns what constitutes a malicious sequence of resource allocations and generates a sequence classification model 214 that is utilized to classify new sequences of resource allocations provided thereto (shown as new data 224) as being a malicious sequence of resource allocations or a non-malicious sequence of resource allocations.

For example, to determine whether a particular valid user's subscription has been comprised, the sequence of resource allocation operations performed using that user's cloud services subscription may be tracked via the activity log(s) generated by resource manager 118 (as shown in FIG. 1). The sequence of resource allocation operations (i.e., new data 224) may be provided to sequence classification model 214, and sequence classification model 214 may output an indication (e.g., a prediction 226) as to whether the inputted sequence (i.e., new data 224) is malicious. Examples of sequences that may be indicative of malicious resource allocation operations may include, but are not limited to, an abnormally high amount of virtual machines and/or storage disks being allocated in a certain period of time, an allocation of virtual machines and/or storage disks during certain hours of the day (e.g. during hours in which users of a particular time zone do not allocate resources), etc. It is noted that these example sequences are merely exemplary and that machine learning-based algorithm 220 may determine any number and/or type of resource allocation sequences to be malicious.

In accordance with an embodiment, prediction 226 outputted by sequence classification model 214 is a probability that the sequence of resource allocation operations provided thereto (i.e., new data 224) is a malicious sequence. Malicious resource allocation detector 130 (as shown in FIG. 1) may compare the probability to a threshold. If the probability exceeds the threshold, malicious resource allocation detector 130 may determine that the sequence of resource allocation operations provided to sequence classification model 514 is a malicious sequence. If the probability does not exceed the threshold, malicious resource allocation detector 130 may determine that the sequence of resource allocation operations provided to sequence classification model 214 is a non-malicious sequence.

In accordance with an embodiment, positively-labeled data 218 comprises data in addition to or in lieu of the sequence of resource allocation operations associated with decoy cloud services subscriptions. For example, positively-labeled data 218 may comprise activity logs associated with cloud services subscriptions of group(s) of employees of the cloud service provider and/or independent contractors that are tasked to find software and/or hardware bugs, security vulnerabilities, etc. (also referred to as "red teams"). The sequences of resource allocation operations performed by such red teams may be positively-labeled and provided to supervised machine learning algorithm 220 as an input to generate sequence classification model 214. Positively-labeled data 218 may also comprise certain sequences of resource allocation operations associated with valid users. For example, resource manager 118 may be configured to generate and provide rule-based alerts to a valid user or security personnel (e.g., an IT administrator) in response to detecting malicious activity. For instance, resource manager 118 may specify one or more rules that specify alert conditions that cause an alert to be generated in response to the condition being violated. Examples of such conditions include, but are not limited to, network traffic originating from a virtual machine exceeding a predetermined threshold, the provisioning of a virtual machine at a certain time, etc. Upon detecting an alert, resource manager 118 may obtain the activity log for the session during which the alert was generated and provide the sequence of resource allocation operations specified therein as an input to supervised machine learning algorithm 220 as positively-labeled data 218.

Upon sequence classification model 214 classifying an inputted sequence of resource allocation operations (i.e., new data 224) as being malicious, resource manager 118 may perform one or more actions to neutralize the malicious sequence. For example, resource manager 118 may deallocate resources allocated by the malicious sequence, suspend the resources allocated by the malicious sequence, prompt the user to change his or her user credentials of the cloud services subscription associated therewith, alert authorities, etc.

Figure 3:
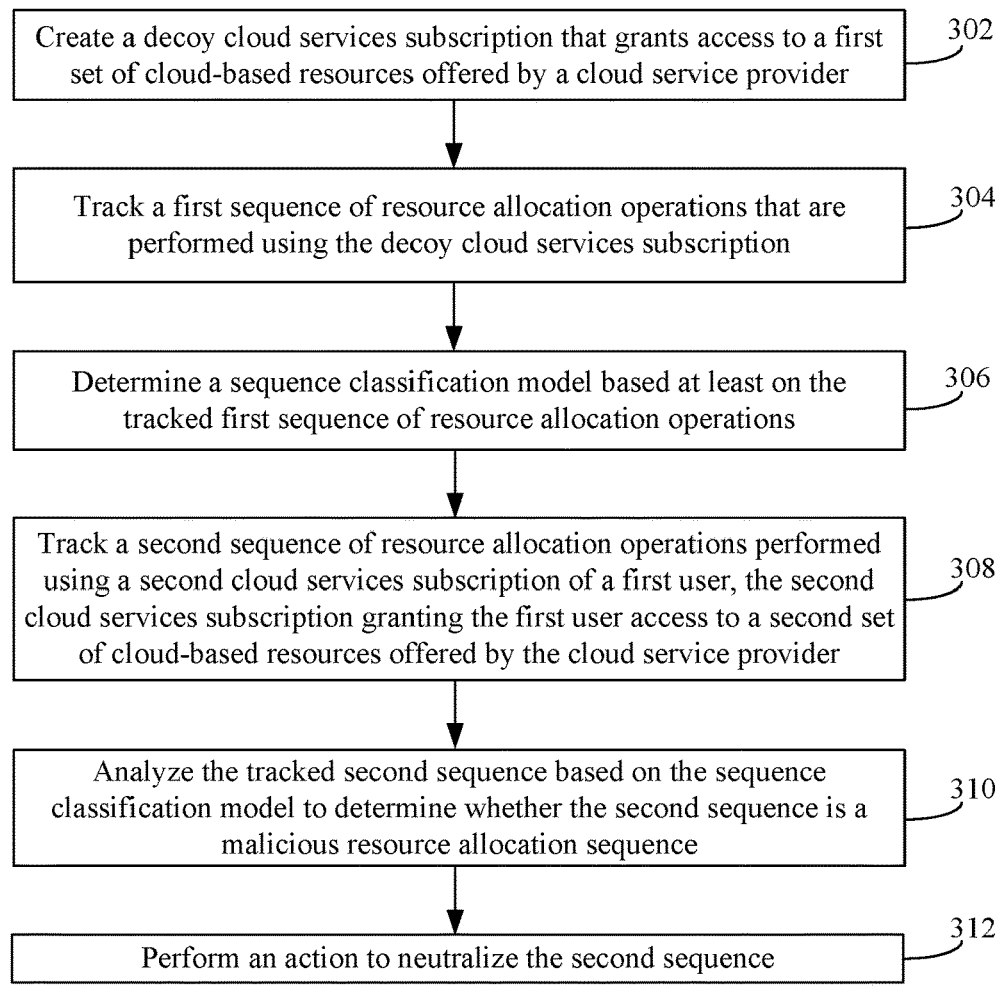
FIG. 3 depicts a flowchart of an example process for detecting malicious cloud-based resource allocation operations, according to an example embodiment.
Figure 4:
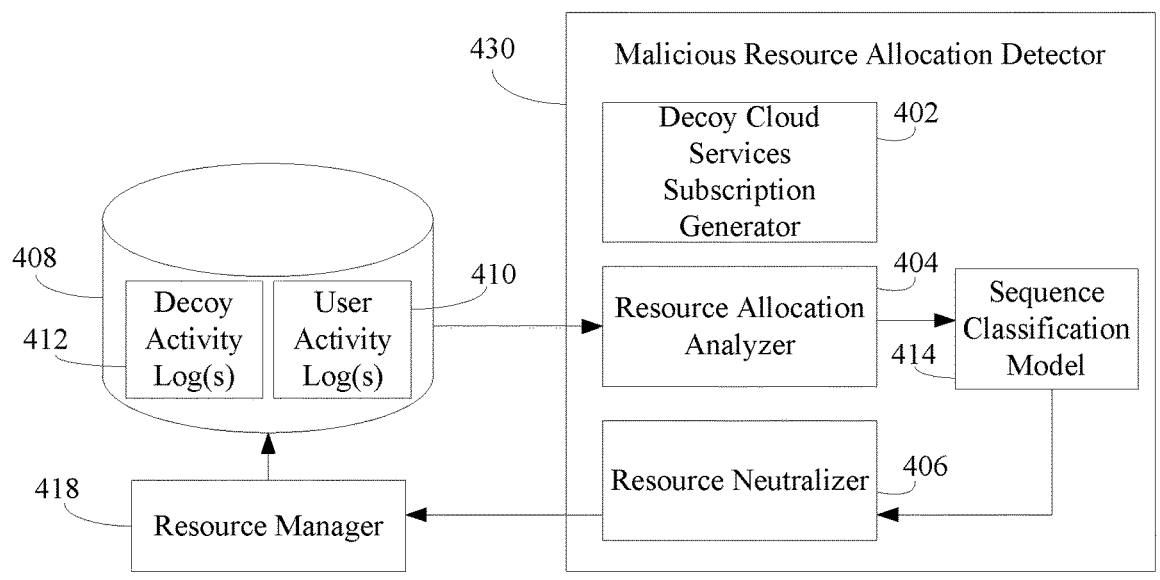
FIG. 4 is a block diagram of a system for detecting malicious cloud-based resource allocation operations, according to another example embodiment.

Accordingly, malicious resource allocation operations may be detected in many ways. For example, FIG. 3 depicts a flowchart 300 of an example process for detecting malicious cloud-based resource allocation operations in accordance with an example embodiment. The method of flowchart 300 will now be described with reference to FIG. 4, although flowchart 300 is not limited to the implementation depicted therein. FIG. 4 is a block diagram of system 400 for detecting malicious cloud-based resource allocation operations in accordance with another example embodiment. As shown in FIG. 4, system 400 includes a resource manager 418 and a malicious resource allocation detector 430. Resource manager 418 and malicious resource allocation detector 430 are examples of resource manager 118 and malicious resource allocation detector 130, as described above with reference to FIG. 1. Malicious resource allocation detector 430 comprises a decoy cloud services subscription generator 402, a resource allocation analyzer 404, and a resource neutralizer 406. Resource manager 418 and malicious resource allocation detector 430 are communicatively coupled to one or more data stores 408. Data store(s) 408 may be maintained by one or more of nodes 108A-108N, 112A-112N and/or 114A-114N and/or storage node(s) 110, as shown in FIG. 1. Data store(s) 408 may store decoy activity log(s) 412 and user activity log(s) 410. Other structural and operational embodiments will be apparent to persons skilled in the relevant art(s) based on the discussion regarding flowchart 300 and system 400.

As shown in FIG. 3, the method of flowchart 300 begins at step 302, in which a decoy cloud services subscription that grants access to a first set of cloud-based resources offered by a cloud service provider is created. For example, with reference to FIG. 4, decoy cloud services subscription generator 402 may generate decoy cloud services subscription(s) that grant access to cloud-based resources offered by a cloud service provider.

In accordance with one or more embodiments, the cloud-based resources comprise at least one of one or more virtual machines or one or more storage disks.

At step 304, a first sequence of resource allocation operations that are performed using the decoy cloud services subscription is tracked. For example, with reference to FIG. 4, resource allocation analyzer 404 tracks the first sequence of resource allocation operations that are performed using the decoy cloud services subscription.

In accordance with one or more embodiments, tracking the first sequence of resource allocation operations comprises generating a first activity log each time a user logs into the decoy cloud services subscription, the first activity log identifying the first sequence, the logged-in user and a time at which each resource allocation operation of the first sequence occurred. For instance, with reference to FIG. 4, resource allocation analyzer 404 may track the first sequence via decoy activity log(s) 412 retrieved from data store(s) 408. For example, resource manager 418 may generate a decoy activity log of decoy activity log(s) 412 each time a user logs into a decoy cloud services subscription. Each of decoy activity log(s) 412 specify the resource allocation operations that were performed during a session in which a user was logged into the decoy cloud services subscription session. Each of decoy activity log(s) 412 may further identify the logged-in user and a time at which each resource allocation operation of the first sequence occurred.

At step 306, a sequence classification model is determined based at least on the tracked first sequence of resource allocation operations. For example, with reference to FIG. 4, resource allocation analyzer 404 may be configured to determine a sequence classification model 414 based at least on the tracked first sequence of resource allocation operations. Sequence classification model 414 is an example of sequence classification model 214, as described above with reference to FIG. 2B. Additional details regarding determining the sequence classification model are described below with reference to FIGS. 5 and 6.

At step 308, a second sequence of resource allocation operations performed using a second cloud services subscription of a first user is tracked. The second cloud services subscription grants the first user access to a second set of cloud-based resources offered by the cloud service provider. For example, with reference to FIG. 4, resource allocation analyzer 404 tracks a second sequence of resource allocation operations performed using a second cloud services subscription of a first user.

In accordance with one or more embodiments, tracking the second sequence of resource allocation operations comprises generating a second activity log each time the first user logs into the associated cloud services subscription, the second activity log identifying the second sequenced, the logged-in user (i.e., the first user) and a time at which each resource allocation operation of the second sequence occurred. For instance, with reference to FIG. 4, resource allocation analyzer 404 may track the second sequence via user activity log(s) 410 retrieved from data store(s) 408. For example, resource manager 418 may generate a user activity log of user activity log(s) 410 each time the first user logs into the associated cloud services subscription. Each of user activity log(s) 410 specify the resource allocation operations that were performed during a session in which the first user was logged into the associated cloud services subscription session. Each of user activity log(s) 410 may further identify the logged-in user (i.e., the first user) and a time at which each resource allocation operation of the second sequence occurred.

At step 310, the tracked second sequence is analyzed based on the sequence classification model to determine whether the second sequence is a malicious resource allocation sequence. For example, with reference to FIG. 4, resource allocation analyzer 404 may analyze the tracked second sequence obtained from user activity log(s) 410 based on sequence classification model 414 to determine whether the second sequence is a malicious resource allocation sequence.

In accordance with one or more embodiments, analyzing the tracked second sequence based on the sequence classification model comprises providing the second sequence as an input to the sequence classification model and receiving an output generated by the sequence classification model that indicates whether the second sequence is a non-malicious resource allocation sequence or a malicious resource allocation sequence. For example, with reference to FIG. 4, resource allocation analyzer 404 may provide the second sequence obtained from user activity log(s) 410 as an input to sequence classification model 414. Sequence classification model 414 may provide an output to resource neutralizer 406 that indicates whether the second sequence is a non-malicious resource allocation sequence or a malicious resource allocation sequence.

In accordance with one or more embodiments, receiving an output comprises receiving a probability generated by the sequence classification model that the second sequence is a malicious resource allocation sequence, and analyzing the tracked second sequence further comprises comparing the probability to a threshold. For example, with reference to FIG. 4, resource neutralizer 406 may receive a probability generated by sequence classification model 414 that the second sequence is a malicious resource allocation sequence. The generated probably may have a value in the range of 0.0 to 1.0, where 0.0 is considered benign and 1.0 is considered malicious, may have one of two values (0 or 1), or may have a value in another value set. Resource neutralizer 406 may analyze the tracked second sequence further by comparing the probability to a threshold (e.g., 0.5). If the probability exceeds the threshold, resource neutralizer 406 may determine that the second sequence is a malicious sequence. If the probability does not exceed the threshold, resource neutralizer 406 may determine that the second sequence is a non-malicious sequence.

At step 312, in response to determining that the second sequence is a malicious resource allocation sequence, an action is performed to neutralize the second sequence. For example, with reference to FIG. 4, resource neutralizer 406 may perform an action to neutralize the second sequence in response to determining that the second sequence is a malicious resource allocation sequence. For example, the output provided by sequence classification model 414 may provide an output that indicates that the second sequence is a malicious resource allocation sequence. In response, resource neutralizer 406 may perform an action to neutralize the second sequence.

In accordance with one or more embodiments, performing the action comprises at least one of deallocating resources allocated by the second sequence of resource allocation operations, suspending the resources allocated by the second sequence of resource allocation operations, or prompting the first user to change user credentials of the cloud services subscription associated therewith. For example, with reference to FIG. 4, resource neutralizer 406 may deallocate resources allocated by the second sequence of resource allocation operations, suspend the resources allocated by the second sequence of resource allocation operations, revoke user credentials, and/or prompt the first user to change user credentials of the cloud services subscription associated therewith.

Figure 5:
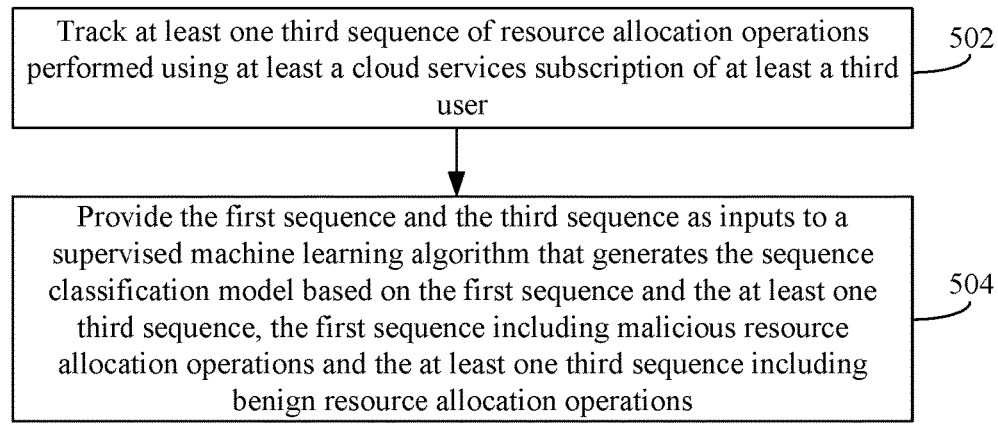
FIG. 5 depicts a flowchart of an example process for determining a sequence classification model, according to an example embodiment.
Figure 6:
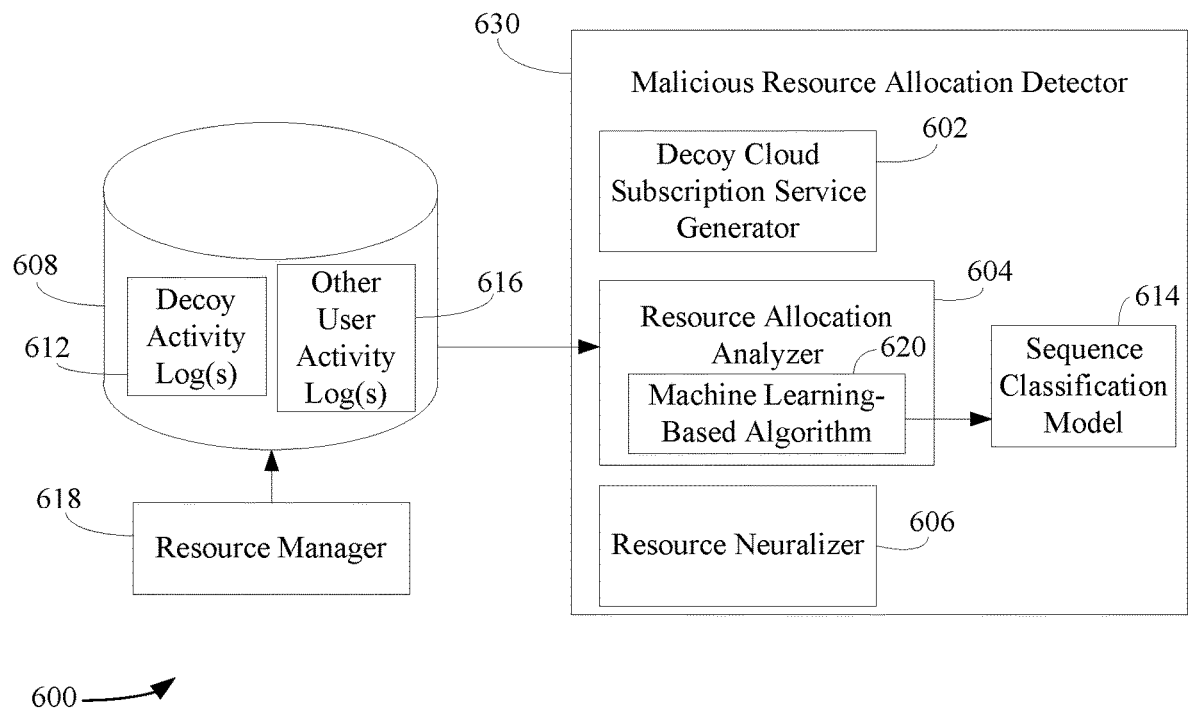
FIG. 6 is a block diagram of a system for determining a sequence classification model, according to an example embodiment.

As described above, a sequence classification model may be generated in various ways. For instance, FIG. 5 depicts a flowchart 500 of an example method for determining a sequence classification model in accordance with an embodiment. The method of flowchart 500 will now be described with reference to FIG. 6, although the method is not limited to the implementation depicted therein. FIG. 6 is a block diagram of system 600 for determining a sequence classification model 614 in accordance with an example embodiment. As shown in FIG. 6, system 600 includes a resource manager 618 and a malicious resource allocation detector 630. Resource manager 618 and malicious resource allocation detector 630 are examples of resource manager 418 and malicious resource allocation detector 430, as described above with reference to FIG. 4. Malicious resource allocation detector 630 comprises a decoy cloud services subscription generator 602, a resource allocation analyzer 604, and a resource neutralizer 606. Decoy cloud services subscription generator 602, resource allocation analyzer 604, and resource neutralizer 606 are examples of decoy cloud services subscription generator 402, a resource allocation analyzer 404, and resource neutralizer 406, as described above with reference to FIG. 4. Resource manager 618 and malicious resource allocation detector 630 are communicatively coupled to data store(s) 608, which are examples of data store(s) 408, as described above with reference to FIG. 4. Data store(s) 608 may store decoy activity log(s) 612 and other user activity log(s) 616. Decoy activity log(s) 612 are examples of decoy activity log(s) 412, as described above with reference to FIG. 4. Other structural and operational embodiments will be apparent to persons skilled in the relevant art(s) based on the discussion regarding flowchart 500 and system 600.

As shown in FIG. 6, the method of flowchart 600 begins at step 602, in which at least one third sequence of resource allocation operations performed using at least a cloud services subscription of at least a third user is tracked. For example, with reference to FIG. 6, resource allocation analyzer 604 may track at least one third sequence of resource allocation operations performed using at least a cloud services subscription of at least a third user. The at least third user is a user that is different than the first user. The at least third user may comprise tens, hundreds, or even thousands of other users. Accordingly, resource allocation operation sequences of tens, hundreds, or even thousands of valid cloud services subscription may be tracked.

In accordance with one or more embodiments, tracking the third sequence of resource allocation operations comprises generating other user activity log(s) each time other user(s) log into their respective cloud services subscription. For instance, with reference to FIG. 6, resource allocation analyzer 604 may track the at least third sequence via other user activity log(s) 616 retrieved from data store(s) 608. For example, resource manager 618 may generate other user activity log(s) 616 each time a respective user logs into his or her respective cloud services subscription. Each of other user activity log(s) 616 specify the resource allocation operations that were performed during a session in which a particular user was logged into their valid cloud services subscription session. Each of other user activity log(s) 616 may further identify the logged-in user and a time at which each resource allocation operation occurred.

At step 604, the first sequence and the at least one third sequence are provided as inputs to a supervised machine learning algorithm that generates the sequence classification model based on the first sequenced and the at least one third sequence. The first sequence includes malicious resource allocation operations, and the at least one third sequence includes benign resource allocation operations. For example, with reference to FIG. 6, resource allocation analyzer 604 may comprise a machine learning-based algorithm 620 (e.g., a supervised machine learning-based algorithm). Machine learning-based algorithm 620 may receive the first sequence (which is obtained via decoy activity log(s) 612) as a first input positively-labeled as "malicious" and may receive the at least one third sequence (which is obtained via other user activity log(s) 616) as a second input negatively-labeled as "non-malicious" or "benign." Machine learning-based algorithm 220 generates sequence classification model 614 based on the first sequence and the at least third sequence. Machine learning-based algorithm 620 is an example of supervised machine learning-based algorithm 220, as described above with reference to FIG. 2. Sequence classification model 614 is an example of sequence classification model 414, as described above with reference to FIG. 4.

Note that machine learning-based algorithm 620 may use any suitable machine learning-based algorithm, including a supervised machine learning-based algorithm. Examples of suitable supervised machine learning-based algorithms that may be implemented by machine learning-based algorithm 620 include support vector machines, linear regression, logistic regression, Bayes-theorem-based algorithms, linear discriminant analysis, decision trees, k-nearest neighbor algorithm, neural networks, etc.

III. Example Computer System Implementation

The systems and methods described above in reference to FIGS. 1-6, may be implemented in hardware, or hardware combined with one or both of software and/or firmware. For example, portal 120, resource manager 118, malicious resource allocation detector 130, browser 126, malicious resource allocation detector 430, resource manager 418, decoy cloud services subscription generator 402, resource allocation analyzer 404, resource neutralizer 406, sequence classification model 414, malicious resource allocation detector 630, resource manager 618, decoy cloud services subscription generator 602, resource allocation analyzer 604, resource neutralizer 606, machine learning-based algorithm 620, sequence classification model 614, flowchart 300, and/or flowchart 500 may be each implemented as computer program code/instructions configured to be executed in one or more processors and stored in a computer readable storage medium. Alternatively, portal 120, resource manager 118, malicious resource allocation detector 130, browser 126, malicious resource allocation detector 430, resource manager 418, decoy cloud services subscription generator 402, resource allocation analyzer 404, resource neutralizer 406, sequence classification model 414, malicious resource allocation detector 630, resource manager 618, decoy cloud services subscription generator 602, resource allocation analyzer 604, resource neutralizer 606, machine learning-based algorithm 620, sequence classification model 614, flowchart 300, and/or flowchart 500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
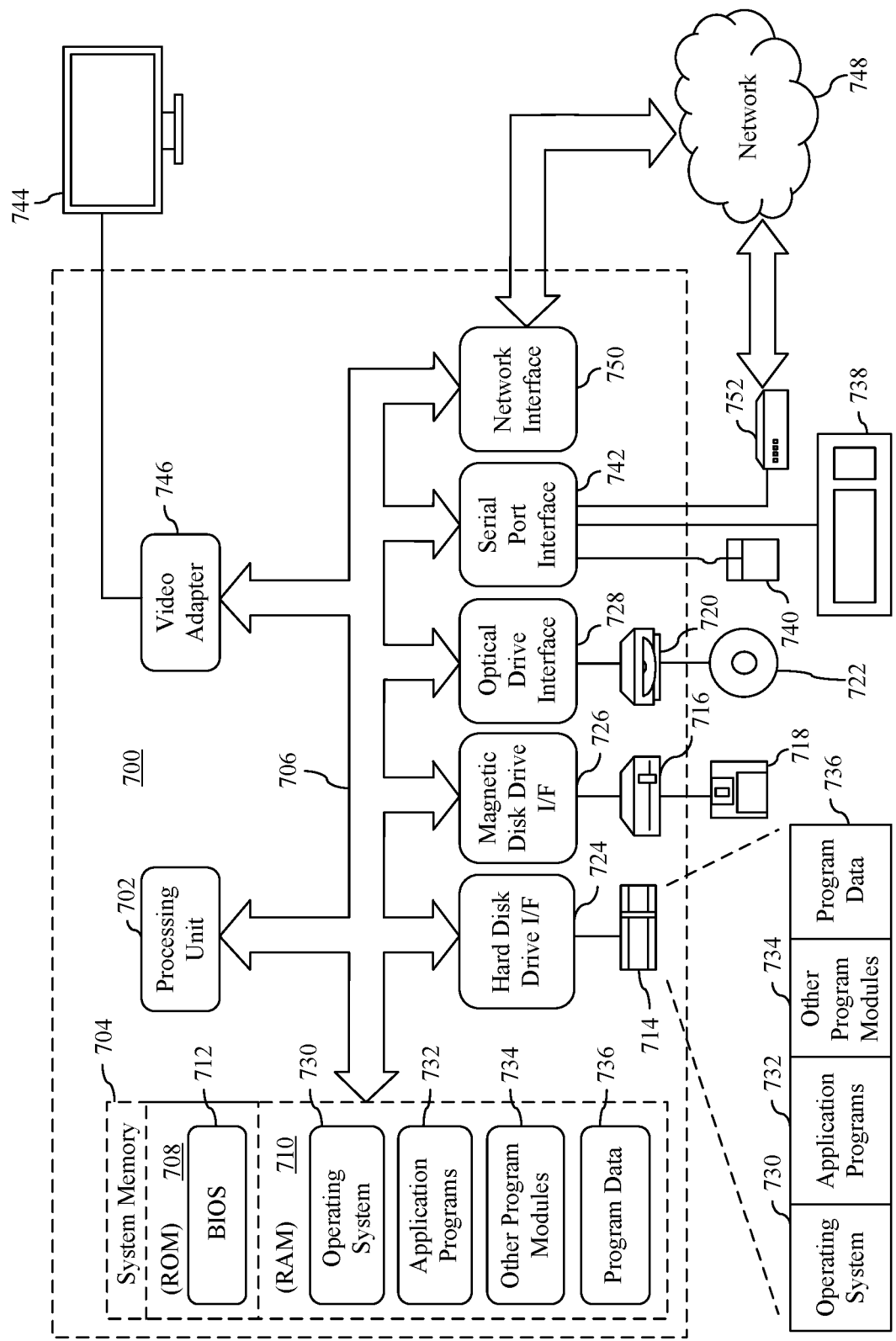
FIG. 7 is a block diagram of an example computing device that may be used to implement embodiments.

Furthermore, FIG. 7 depicts an exemplary implementation of a computing device 700 in which embodiments may be implemented, including nodes 108A-108N, 112A-112N, 114A-114N, storage node(s) 110, storage disks 122, computing device 124, data store(s) 408, data store(s) 608, portal 120, resource manager 118, malicious resource allocation detector 130, browser 126, malicious resource allocation detector 430, resource manager 418, decoy cloud services subscription generator 402, resource allocation analyzer 404, resource neutralizer 406, sequence classification model 414, malicious resource allocation detector 630, resource manager 618, decoy cloud services subscription generator 602, resource allocation analyzer 604, resource neutralizer 606, machine learning-based algorithm 620, sequence classification model 614, and/or each of the components described therein, and flowchart 300 and/or flowchart 500.

The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a disk drive 714 for reading from and writing to a hard disk or a solid state drive, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the malicious resource allocation detection systems and techniques described in reference to FIGS. 1-6.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 780, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation®).

IV. Additional Exemplary Embodiments

A method is described herein. The method includes: creating a decoy cloud services subscription that grants access to a first set of cloud-based resources offered by a cloud service provider; tracking a first sequence of resource allocation operations that are performed using the decoy cloud services subscription; determining a sequence classification model based at least on the tracked first sequence of resource allocation operations; tracking a second sequence of resource allocation operations performed using a second cloud services subscription of a first user, the second cloud services subscription granting the first user access to a second set of cloud-based resources offered by the cloud service provider; analyzing the tracked second sequence based on the sequence classification model to determine whether the second sequence is a malicious resource allocation sequence; and in response to determining that the second sequence is a malicious resource allocation sequence, performing an action to neutralize the second sequence.

In one embodiment of the foregoing method, said determining a sequence classification model based at least on the tracked first sequence of resource allocation operations comprises: tracking at least one third sequence of resource allocation operations performed using at least a cloud services subscription of at least a third user; and providing the first sequence and the at least one third sequence as inputs to a supervised machine learning algorithm that generates the sequence classification model based on the first sequence and the at least one third sequence, the first sequence including malicious resource allocation operations and the at least one third sequence including benign resource allocation operations.

In another embodiment of the foregoing method, said analyzing the tracked second sequence based on the sequence classification model to determine whether the second sequence is a malicious resource allocation sequence comprises: providing the second sequence as an input the sequence classification model; and receiving an output generated by the sequence classification model that indicates whether the second sequence is a non-malicious resource allocation sequence or a malicious resource allocation sequence.

In a further embodiment of the foregoing method, said receiving an output comprises: receiving a probability generated by the sequence classification model that the second sequence is a malicious resource allocation sequence; and wherein analyzing the tracked second sequence further comprises: comparing the probability to a threshold.

In yet another embodiment of the foregoing method, the cloud-based resources comprise at least one of one or more virtual machines; or one or more storage disks.

In still another embodiment of the foregoing method, said performing an action comprises at least one of: deallocating resources allocated by the second sequence of resource allocation operations; suspending the resources allocated by the second sequence of resource allocation operations; or prompting the first user to change user credentials of the cloud services subscription associated therewith.

In another embodiment of the foregoing method, said tracking the first sequence of resource allocation operations comprises: generating a first activity log each time a user logs into the decoy cloud services subscription, the first activity log identifying the first sequence, the logged-in user and a time at which each resource allocation operation of the first sequence occurred, and wherein said tracking the second sequence of resource allocation operations comprises: generating a second activity log each time the first user logs into the associated cloud services subscription, the second activity log identifying the second sequence, the first user and a time at which each resource allocation of the second sequence occurred.

A server is described. The server comprises at least one processor circuit; and at least one memory that stores program code configured to be executed by the at least one processor circuit, the program code comprising: a decoy cloud subscription service generator configured to: create a decoy cloud services subscription that grants access to a first set of cloud-based resources offered by a cloud service provider; a resource allocation analyzer configured to: track a first sequence of resource allocation operations that are performed using the decoy cloud services subscription; determine a sequence classification model based at least on the tracked first sequence of resource allocation operations; track a second sequence of resource allocation operations performed using a second cloud services subscription of a first user, the second cloud services subscription granting the first user access to a second set of cloud-based resources offered by the cloud service provider; and analyze the tracked second sequence based on the sequence classification model to determine whether the second sequence is a malicious resource allocation sequence; and a resource neutralizer configured to: in response to a determination that the second sequence is a malicious resource allocation sequence, perform an action to neutralize the second sequence.

In one embodiment of the foregoing server, the resource allocation analyzer is configured to determine a sequence classification model based at least on the tracked first sequence of resource allocation operations by: identifying at least one third sequence associated with resource allocation operations that are performed using a cloud services subscription of at least a second user; and providing the second sequence as an input to a machine learning-based algorithm that outputs an indication of whether the second sequence is a non-malicious resource allocation sequence or a malicious resource allocation sequence, the machine learning-based algorithm being trained on the at least one third sequence and the first sequence.

In another embodiment of the foregoing server, the resource allocation analyzer is configured to analyze the tracked second sequence based on the sequence classification model to determine whether the second sequence is a malicious resource allocation sequence by: providing the second sequence as an input the sequence classification model; and receiving an output generated by the sequence classification model that indicates whether the second sequence is a non-malicious resource allocation sequence or a malicious resource allocation sequence.

In yet another embodiment of the foregoing server, the resource allocation analyzer is configured to receive the output by: receiving a probability generated by the sequence classification model that the second sequence is a malicious resource allocation sequence, wherein the resource allocation analyzer is configured to analyze the tracked second sequence by: comparing the probability to a threshold.

In still another embodiment of the foregoing server, the cloud-based resources comprise at least one of: one or more virtual machines; or one or more storage disks.

In yet another embodiment of the foregoing server, the resource neutralizer is configured to perform the action by performing at least one of: deallocate resources allocated by the second sequence of resource allocation operations; suspend the resources allocated by the second sequence of resource allocation operations; or prompt the first user to change user credentials of the cloud services subscription associated therewith.

In still another embodiment of the foregoing server, the resource allocation analyzer is configured to track the first sequence of resource allocation operations by: generating a first activity log each time a user logs into the decoy cloud services subscription, the first activity log identifying the first sequence, the logged-in user and a time at which each resource allocation operation of the first sequence occurred; and wherein the resource allocation analyzer is configured to track the second sequence of resource allocation operations by: generating a second activity log each time the first user logs into the associated cloud services subscription, the second activity log identifying the second sequence, the first user and a time at which each resource allocation of the second sequence occurred.

A computer-readable storage medium having program instructions recorded thereon that, when executed by at least one processor, perform a method, the method comprising: creating a decoy cloud services subscription that grants access to a first set of cloud-based resources offered by a cloud service provider; tracking a first sequence of resource allocation operations that are performed using the decoy cloud services subscription; determining a sequence classification model based at least on the tracked first sequence of resource allocation operations; tracking a second sequence of resource allocation operations performed using a second cloud services subscription of a first user, the second cloud services subscription granting the first user access to a second set of cloud-based resources offered by the cloud service provider; analyzing the tracked second sequence based on the sequence classification model to determine whether the second sequence is a malicious resource allocation sequence; and in response to determining that the second sequence is a malicious resource allocation sequence, performing an action to neutralize the second sequence.

In one embodiment of the foregoing computer-readable storage medium, said determining a sequence classification model based at least on the tracked first sequence of resource allocation operations comprises: tracking at least one third sequence of resource allocation operations performed using at least a cloud services subscription of at least a third user; and providing the first sequence and the at least one third sequence as inputs to a supervised machine learning algorithm that generates the sequence classification model based on the first sequence and the at least one third sequence, the first sequence including malicious resource allocation operations and the at least one third sequence including benign resource allocation operations.

In another embodiment of the foregoing computer-readable storage medium, said analyzing the tracked second sequence based on the sequence classification model to determine whether the second sequence is a malicious resource allocation sequence comprises: providing the second sequence as an input the sequence classification model; and receiving an output generated by the sequence classification model that indicates whether the second sequence is a non-malicious resource allocation sequence or a malicious resource allocation sequence.

In a further embodiment of the foregoing computer-readable storage medium, said receiving an output comprises: receiving a probability generated by the sequence classification model that the second sequence is a malicious resource allocation sequence; and wherein analyzing the tracked second sequence further comprises: comparing the probability to a threshold.

In yet another embodiment of the foregoing computer-readable storage medium, the cloud-based resources comprise at least one of one or more virtual machines; or one or more storage disks.

In still another embodiment of the foregoing computer-readable storage medium, said performing an action comprises at least one of: deallocating resources allocated by the second sequence of resource allocation operations; suspending the resources allocated by the second sequence of resource allocation operations; or prompting the first user to change user credentials of the cloud services subscription associated therewith.

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
creating a decoy cloud services subscription that grants access to a first set of cloud-based resources offered by a cloud service provider;
tracking a first sequence of resource allocation operations that are performed using the decoy cloud services subscription;
tracking at least one second sequence of resource allocation operations performed using at least a first cloud services subscription of at least a first user;
providing the first sequence and the at least one second sequence as inputs to a supervised machine learning algorithm that generates a sequence classification model based on the first sequence and the at least one second sequence, the first sequence including malicious resource allocation operations and the at least one second sequence including benign resource allocation operations;
tracking a third sequence of resource allocation operations performed using a second cloud services subscription of a second user, the second cloud services subscription granting the second user access to a second set of cloud-based resources offered by the cloud service provider;
analyzing the tracked third sequence based on the sequence classification model to determine whether the third sequence is a malicious resource allocation sequence; and
in response to determining that the third sequence is a malicious resource allocation sequence, performing an action to neutralize the third sequence.

2. The method of claim 1, wherein said analyzing the tracked third sequence based on the sequence classification model to determine whether the third sequence is a malicious resource allocation sequence comprises:
providing the third sequence as an input to the sequence classification model; and receiving an output generated by the sequence classification model that indicates whether the third sequence is a non-malicious resource allocation sequence or a malicious resource allocation sequence.

3. The method of claim 2, wherein said receiving an output comprises:
receiving a probability generated by the sequence classification model that the third sequence is a malicious resource allocation sequence; and
wherein analyzing the tracked third sequence further comprises:
comparing the probability to a threshold.

4. The method of claim 1, wherein the cloud-based resources comprise at least one of:
one or more virtual machines; or
one or more storage disks.

5. The method of claim 1, wherein said performing an action comprises at least one of:
deallocating resources allocated by the third sequence of resource allocation operations;
suspending the resources allocated by the third sequence of resource allocation operations; or
prompting the first user to change user credentials of the cloud services subscription associated therewith.

6. The method of claim 1, wherein said tracking the first sequence of resource allocation operations comprises:
generating a first activity log each time a user logs into the decoy cloud services subscription, the first activity log identifying the first sequence, the logged-in user and a time at which each resource allocation operation of the first sequence occurred, and
wherein said tracking the third sequence of resource allocation operations comprises:
generating a second activity log each time the first user logs into the associated cloud services subscription, the second activity log identifying the third sequence, the first user and a time at which each resource allocation of the third sequence occurred.

7. The method of claim 1, wherein the first sequence of resource operations is performed via a user interface of the decoy cloud services subscription.

8. A server, comprising:
at least one processor circuit; and
at least one memory that stores program code configured to be executed by the at least one processor circuit, the program code comprising:
a decoy cloud subscription service generator configured to:
create a decoy cloud services subscription that grants access to a first set of cloud-based resources offered by a cloud service provider;
a resource allocation analyzer configured to:
track a first sequence of resource allocation operations that are performed using the decoy cloud services subscription;
track at least one second sequence of resource allocation operations performed using at least a first cloud services subscription of at least a first user;
provide the first sequence and the at least one second sequence as inputs to a supervised machine learning algorithm that generates a sequence classification model based on the first sequence and the at least one second sequence, the first sequence including malicious resource allocation operations and the at least one second sequence including benign resource allocation operations;
track a third sequence of resource allocation operations performed using a second cloud services subscription of a second user, the second cloud services subscription granting the second user access to a second set of cloud-based resources offered by the cloud service provider; and
analyze the tracked third sequence based on the sequence classification model to determine whether the third sequence is a malicious resource allocation sequence; and a resource neutralizer configured to:
in response to a determination that the second third sequence is a malicious resource allocation sequence, perform an action to neutralize the third sequence.

9. The server of claim 8, wherein the resource allocation analyzer is configured to analyze the tracked third sequence based on the sequence classification model to determine whether the third sequence is a malicious resource allocation sequence by:
providing the third sequence as an input to the sequence classification model; and
receiving an output generated by the sequence classification model that indicates whether the third sequence is a non-malicious resource allocation sequence or a malicious resource allocation sequence.

10. The server of claim 9, wherein the resource allocation analyzer is configured to receive the output by:
receiving a probability generated by the sequence classification model that the third sequence is a malicious resource allocation sequence, and
wherein the resource allocation analyzer is configured to analyze the tracked third sequence by:
comparing the probability to a threshold.

11. The server of claim 8, wherein the cloud-based resources comprise at least one of:
one or more virtual machines; or
one or more storage disks.

12. The server of claim 8, wherein the resource neutralizer is configured to perform the action by performing at least one of:
deallocate resources allocated by the third sequence of resource allocation operations;
suspend the resources allocated by the third sequence of resource allocation operations; or
prompt the first user to change user credentials of the cloud services subscription associated therewith.

13. The server of claim 8, wherein the resource allocation analyzer is configured to track the first sequence of resource allocation operations by:
generating a first activity log each time a user logs into the decoy cloud services subscription, the first activity log identifying the first sequence, the logged-in user and a time at which each resource allocation operation of the first sequence occurred; and
wherein the resource allocation analyzer is configured to track the third sequence of resource allocation operations by:
generating a second activity log each time the first user logs into the associated cloud services subscription, the second activity log identifying the third sequence, the first user and a time at which each resource allocation of the third sequence occurred.

14. The server of claim 8, wherein the first sequence of resource operations are performed via a user interface of the decoy cloud services subscription.

15. A computer-readable storage medium having program instructions recorded thereon that, when executed by at least one processor, perform a method, the method comprising:
creating a decoy cloud services subscription that grants access to a first set of cloud-based resources offered by a cloud service provider;
tracking a first sequence of resource allocation operations that are performed using the decoy cloud services subscription;
tracking at least one second sequence of resource allocation operations performed using at least a first cloud services subscription of at least a first user;
providing the first sequence and the at least one second sequence as inputs to a supervised machine learning algorithm that generates a sequence classification model based on the first sequence and the at least one second sequence; the first sequence including malicious resource allocation operations and the at least one second sequence including benign resource allocation operations;
tracking a third sequence of resource allocation operations performed using a second cloud services subscription of a second user; the second cloud services subscription granting the second user access to a second set of cloud-based resources offered by the cloud service provider;
analyzing the tracked third sequence based on the sequence classification model to determine whether the third sequence is a malicious resource allocation sequence; and
in response to determining that the third sequence is a malicious resource allocation sequence; performing an action to neutralize the third sequence.

16. The computer-readable storage medium of claim 15; wherein said analyzing the tracked third sequence based on the sequence classification model to determine whether the third sequence is a malicious resource allocation sequence comprises:
providing the third sequence as an input to the sequence classification model; and
receiving an output generated by the sequence classification model that indicates whether the third sequence is a non-malicious resource allocation sequence or a malicious resource allocation sequence.

17. The computer-readable storage medium of claim 16, wherein said receiving an output comprises:
receiving a probability generated by the sequence classification model that the third sequence is a malicious resource allocation sequence; and
wherein analyzing the tracked third sequence further comprises:
comparing the probability to a threshold.

18. The computer-readable storage medium of claim 15, wherein the cloud-based resources comprise at least one of:
one or more virtual machines; or
one or more storage disks.

19. The computer-readable storage medium of claim 15, wherein said performing the action comprises at least one of:
deallocating resources allocated by the third sequence of resource allocation operations;
suspending the resources allocated by the third sequence of resource allocation operations; or
prompting the first user to change user credentials of the cloud services subscription associated therewith.

20. The computer-readable storage medium of claim 15, wherein the first sequence of resource operations are performed via a user interface of the decoy cloud services subscription.

* * * * *